United States Patent
Seidl

(10) Patent No.: US 7,044,150 B2
(45) Date of Patent: May 16, 2006

(54) COMBINATION VENT/CHECK VALVE ASSEMBLY

(75) Inventor: Gerard L. Seidl, Croswell, MI (US)

(73) Assignee: Huron, Inc., Lexington, MI (US)

( * ) Notice: Subject to any disclaimer, the term of this patent is extended or adjusted under 35 U.S.C. 154(b) by 270 days.

(21) Appl. No.: 10/608,510

(22) Filed: Jun. 27, 2003

(65) Prior Publication Data

US 2004/0003846 A1    Jan. 8, 2004

Related U.S. Application Data

(60) Provisional application No. 60/393,388, filed on Jul. 2, 2002.

(51) Int. Cl.
*F16K 17/19*    (2006.01)
(52) U.S. Cl. ............ 137/15.19; 137/493; 137/493.1; 137/846
(58) Field of Classification Search ............ 137/493.2, 137/493.1, 493.9, 846, 15.19; 74/606 R
See application file for complete search history.

(56) References Cited

U.S. PATENT DOCUMENTS

| | | | | |
|---|---|---|---|---|
| 3,314,306 A | * | 4/1967 | Barclae | 74/606 R |
| 3,388,825 A | * | 6/1968 | Miller | 137/493.2 |
| 3,693,651 A | * | 9/1972 | Gifford | 137/493 |
| 4,165,816 A | * | 8/1979 | Tupper | 137/493.2 |
| 4,434,810 A | * | 3/1984 | Atkinson | 137/493 |
| 4,554,844 A | * | 11/1985 | Hamano | 74/606 R |
| 5,062,447 A | * | 11/1991 | Davison et al. | 137/493 |
| 5,105,848 A | * | 4/1992 | Kallenbach | 137/493.1 |
| 5,722,367 A | * | 3/1998 | Izydorek et al. | 123/339.13 |
| 6,015,444 A | | 1/2000 | Craft et al. | |
| 6,217,639 B1 | | 4/2001 | Jackson | |
| 6,289,726 B1 | * | 9/2001 | Ferris et al. | 73/118.1 |
| 6,447,565 B1 | | 9/2002 | Raszkowski et al. | |

* cited by examiner

*Primary Examiner*—Stephen M. Hepperle
(74) *Attorney, Agent, or Firm*—Harness, Dickey & Pierce, PLC

(57) ABSTRACT

A bidirectional valve comprising a flexible member with an aperture formed therein. The flexible member reacts to differential pressure thereacross by deforming, thereby causing the inside surfaces of the aperture to separate and create a vent path. The bidirectional valve can be tuned to open the aperture in reaction to varied differential pressures thereacross, thereby allowing a fluid to pass through the aperture.

17 Claims, 2 Drawing Sheets

COMBINATION VENT/CHECK VALVE ASSEMBLY

CROSS-REFERENCE TO RELATED APPLICATIONS

This application claims the benefit of U.S. Provisional Application No. 60/393,388, filed on Jul. 2, 2002. The disclosure of the above application is incorporated herein by reference.

FIELD OF THE INVENTION

The present invention relates generally to bidirectional relief valves, and more specifically to an automatic transmission vent/relief valve.

BACKGROUND OF THE INVENTION

A conventional automatic transmission for a vehicle includes rotating shafts that penetrate a housing. These shafts typically have bearings that rotatably support the shafts within the housing and seals are incorporated on the outside of the bearings in order to retain the transmission fluid within the housing and to keep dirt and contamination out of the housing. During operation, a conventional automatic transmission generates heat which is dissipated by the transmission fluid. A typical transmission can exceed 200° F. during normal operation. As the internal housing of the transmission is heated, the air within the housing absorbs some of the heat. As this air is heated, it undergoes a volumetric expansion and/or increase in pressure. In a sealed transmission, an increase in internal air pressure within a fluid chamber may be relieved through the shaft seals. As air escapes past the seals, it pushes some transmission fluid out through the bearings and seals to the outside of the transmission housing. This leaking of transmission fluid is undesirable, in part, because it would require additional transmission fluid to be added periodically.

Additionally, a transmission housing that has relieved air by pushing air and transmission fluid out past the bearings, will draw or suck air back in through the bearings as the air within the transmission housing cools and contracts. As air is drawn in past the seals, dirt and other contaminants can be pulled past the seals and into the bearings and fluid chamber. This contamination can shorten the life of the bearings and internal moving parts.

Therefore, to prevent an unwanted air pressure increase, air is typically vented to the outside of the transmission housing to relieve the volumetric expansion of air. Typically a vent or breather assembly is incorporated into a transmission housing in order to relieve the pressure due to this expansion of the heated air. This vent includes an elongated body inserted through an aperture in the transmission housing having a cap and a filter assembly inserted therein. The vent assemblies involve multiple machined components and typically regulate the internal pressure of the transmission equal to that of the ambient pressure outside of the transmission.

One drawback associated with this design is the inability of these vent assemblies to limit the amount of ambient air allowed into the transmission fluid chamber. As the transmission cools and air is drawn back into the transmission housing, the moisture, or humidity, within the ambient air is also drawn into the housing. As the transmission cools further, this moisture condenses within the transmission housing and mixes or stratifies within the transmission fluid. The operation of the automatic transmission can be adversely affected if an undesirable amount of water is pulled into the transmission through the vent assembly.

Another drawback associated with typical vent assemblies involves fill tube overflow. Transmission fluid is typically added to an automatic transmission through a fill tube. As fluid is added, some vent assemblies may not allow for adequate pressure relief of air to account for the volume of fluid added. When this occurs, fluid flow down the fill tube will slow and/or stop due to an air pressure increase within the transmission that exceeds the pressure exerted by the level of fluid in the fill tube. As more fluid is poured into the tube, the rate of fluid being poured can exceed the rate of fluid flow through the fill tube, causing the fluid to undesirably overflow the fill tube and spill onto the components located adjacent the fill tube.

What is needed is a transmission vent assembly that will allow an adequate amount of air pressure to be relieved and that also incorporates a relief assembly that will actuate when a pre-selected differential pressure across the transmission housing is reached.

SUMMARY OF THE INVENTION

In accordance with the teachings of the present invention, a method and apparatus for venting an automatic transmission is disclosed. In one form, the present invention provides a bidirectional vent valve for an automatic transmission that includes a flexible member defining a slit therein. The flexible member is configured to seal the transmission housing and to relieve pressure bi-directionally once a pre-selected pressure differential across the flexible member is experienced.

In another form, the present invention provides a method for venting an automotive component including coupling a flexible member to a housing of an automotive component wherein the flexible member defines a slit therein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
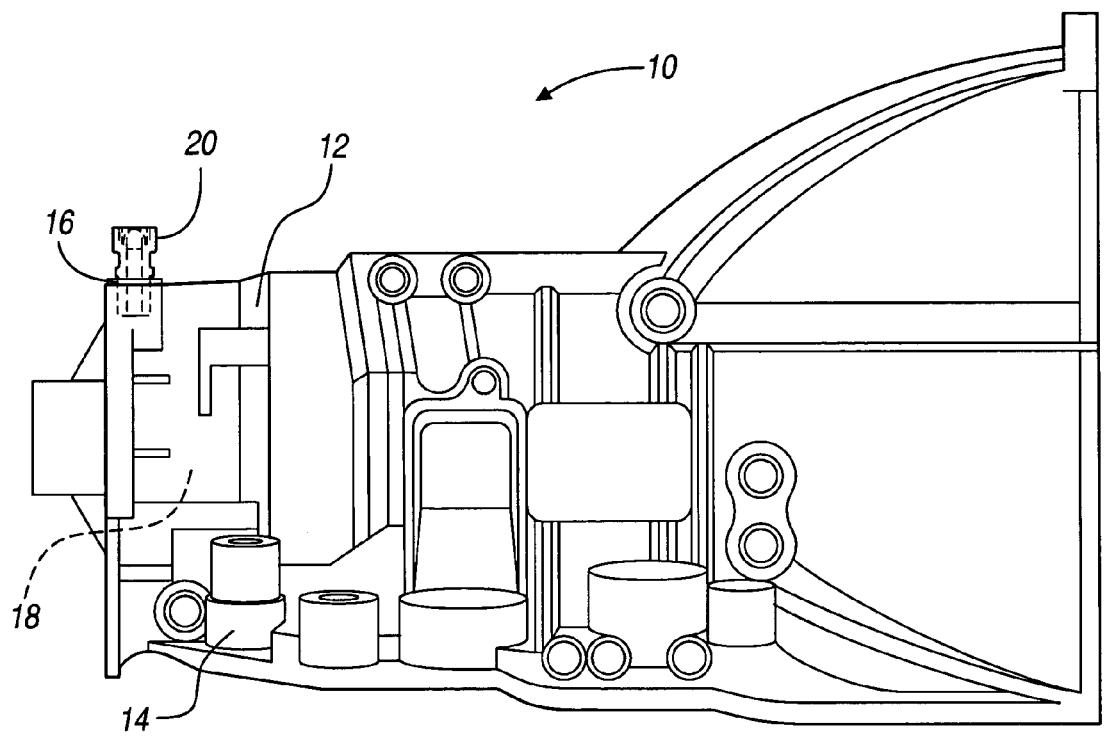
FIG. 1 is a perspective view of an automatic transmission in accordance with the teachings of the present invention.

The following description of the preferred embodiments of a method and apparatus for venting an automatic transmission are merely exemplary in nature and is no way intended to limit the invention, its application, or uses. Moreover, while the present invention is described in detail with a reference to an automatic transmission, it will be appreciated by those skilled in the art that the present invention is not limited to an automatic transmission but may also be used with any other housing that requires a vent valve. With initial reference to FIG. 1, an automatic transmission in accordance with the teachings of the present invention is illustrated and referred to generally by the numeral 10. Automatic transmission 10 includes a top portion 12, and a bottom portion 14 defining a chamber 18. Top portion 12 defines a vent aperture 16 that provides a passageway between chamber 18 and an external surface of top portion 12. A valve 20 is interposed within vent aperture 16.

Figure 2:
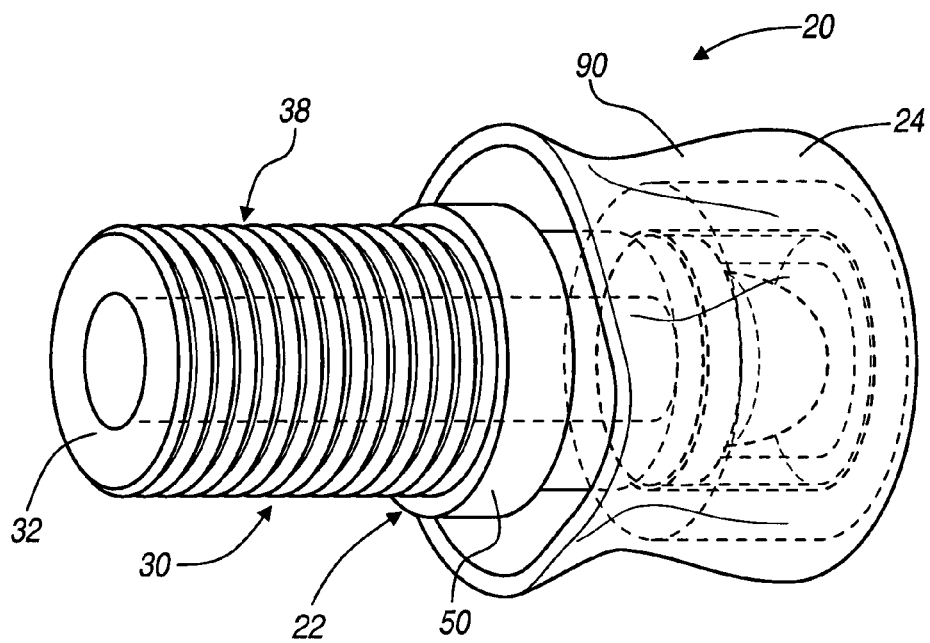
FIG. 2 is a perspective view of the vent valve illustrated in FIG. 1.
Figure 3:
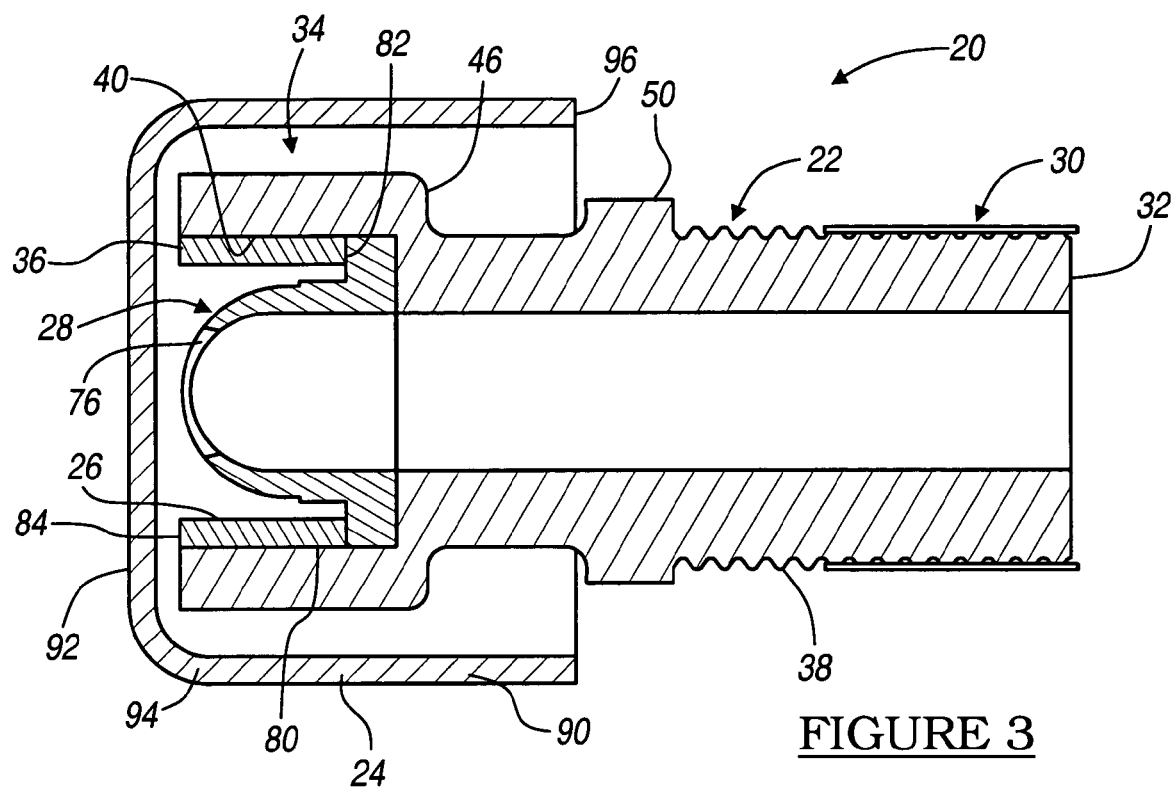
FIG. 3 is a sectional view of the vent valve of FIG. 2.

With specific reference to FIGS. 2 and 3, valve 20 includes a body 22, a cap 24, a sleeve 26, and a flexible member, or vent, 28. Body 22 is illustrated to include a connecting portion 30 at a first end 32, and a venting portion 34 at a second end 36. Connecting portion 30 includes a ridged surface 38 for engaging the valve aperture 16. Venting portion 32 includes an inside bore 40, and a shoulder 46 that extends about the circumference of body 22. Connecting portion 30 further includes an internal bore 48 that extends from first end 32 to inside bore 40. Body 22 further includes a collar 50 formed about the circumference of body 22 wherein ridged surface 38 extends from collar 50 to first end 32. As presently preferred, body 22 is turned from AISI 12L14 steel.

Figure 4:
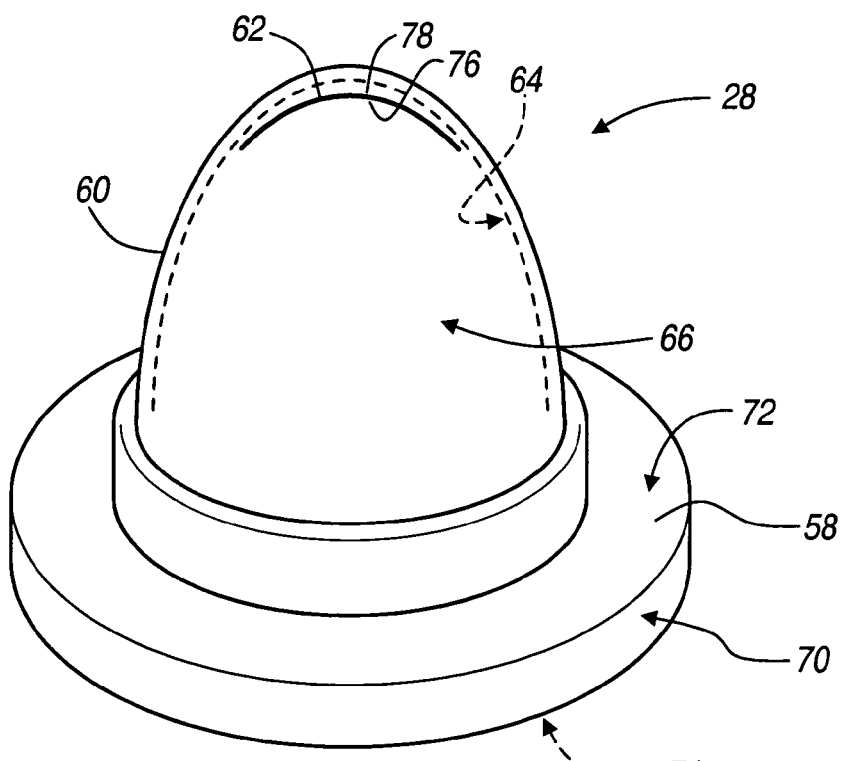
FIG. 4 is a perspective of the vent of FIG. 3.

Referring now to FIG. 4, vent 28 includes an annular retaining collar 58 connected to a flexible, hollow dome 60 having a slit 62 formed therein. Dome 60 is defined by an inner surface 64 and an outer surface 66. Retaining collar 58 includes a circular outer surface 70, a top surface 72, and a bottom surface 74. Slit 62 is defined by an inside surface 76 and an inside surface 78. Inside surfaces 76, 78 extend from the inner surface 64 to the outer surface 66. Vent 28 is configured to be interposed within inside bore 40 such that dome 60 extends away from first end 32, as best seen in FIG. 3. As presently preferred, vent 28 is constructed of fluorosilicon. It will become apparent below that dome 60 could be formed to any shape, including a flat or curved, that provides a flexible portion. When the air pressure acting on inner surface 64 exceeds the air pressure acting on outer surface 66, a first pressure differential condition is created. When the air pressure acting on outer surface 66 exceeds the air pressure acting on inner surface 64, a second pressure differential condition is created.

As illustrated in FIG. 3, sleeve 26 includes a cylindrical mating surface 80 disposed between a lower end 82 and an upper end 84. Sleeve 26 is configured to be inserted into body 22 wherein mating surface 80 is in interference with inside bore 40. In this manner, sleeve 26 retains vent 28 within body 22.

Cap 24 includes a cylindrical wall 90, intersecting an end member 92 at a first end 94, and a second end 96. When assembled, cap 24 is superposed about venting portion 34 and second end 96 is crimped in at least two places such that cylindrical wall 90 contacts shoulder 46. In this manner, cap 24 is retained on body 22 while providing a vent path 100 therebetween. As presently preferred, cap 24 is stamped from AISI 1010 steel.

Valve 20 is inserted into valve aperture 16 and driven into valve aperture 16 with a rubber hammer. As valve 20 is inserted into vent aperture 16, ridge surface 38 engages the internal surface of vent aperture 16 thereby retaining valve 20 within vent aperture 16.

During operation of transmission 10, heat from the internal rotating members of transmission 10 is transferred to the fluid within transmission 10 and also to the air within chamber 18. As the air is heated within the chamber 18, air pressure within transmission 10 increases to a pressure greater than ambient. This increase in air pressure produces a first differential pressure as the pressure on inner surface 64 acts to deform dome 60. The first differential pressure is the amount that the internal air pressure within transmission 10 exceeds an ambient air pressure outside of transmission 10. As the air pressure within chamber 18 increases, dome 60 is deformed such that inside surfaces 76, 78 of slit 62 are forced apart, thereby providing an opening, or vent path, for the air to be expelled from the chamber 18. When air is vented out of chamber 18, the air pressure within chamber 18 is reduced, thereby allowing dome 60 to deform such that inside surfaces 76, 78 of slit 62 come together to reestablish a seal therebetween.

As will be appreciated by one skilled in the art, the shape of dome 60, the length of slit 62, and the thickness of vent 28 are factors that determine a minimum first differential pressure across vent 28 that will open slit 62. As presently preferred, slit 62 opens when the first differential pressure reaches a range of greater than 0.0 to about 1.0 psid, and more preferably, about 0.25 psid. Thus provided, valve 20 allows a portion of the air pressure within transmission 10 to be reduced by venting air within chamber 18 to a location outside of transmission 10 when the first differential pressure exceeds a predetermined value.

As transmission 10 begins to cool, the air within the chamber 18 will cool and contract. This contraction of air within transmission 10 will decrease the internal air pressure within the chamber 18. As the air pressure within the chamber 18 decreases below the ambient air pressure outside of transmission housing 10, the second pressure differential condition is produced. When the second pressure differential condition is produced, the ambient air pressure begins to push on outside surface 66 of vent 28. This decrease in air pressure within chamber 18 produces a second differential pressure as the greater pressure on outer surface 66 acts to deform dome 60. The second differential pressure is the amount that the ambient air pressure outside of transmission 10 exceeds the internal air pressure within transmission 10. As the air within the chamber 18 cools further, the second differential pressure increases, causing the dome 60 of vent 28 to deform until inside surfaces 76, 78 are forced apart, thereby allowing air to enter the chamber 18. As presently preferred, vent 28 will allow air to enter the chamber 18 when the second differential pressure reaches a range of greater than 0.0 to about 3.0 psid, and more preferably, about 1.25 psid. In this manner, vent 28 provides a bidirectional relief/vent valve 20 for transmission 10. The curvature of dome 60 is predetermined in order to cause valve 20 to actuate in response to both the first differential pressure and the second differential pressure. The cap 24 provides a protective device for vent 28 by inhibiting contact with water, dirt and other contaminants.

It is envisioned that while vent 28 is described as being comprised or constructed of fluorosilicon, that the vent 28 could be constructed of other flexible materials that would allow slit 62 to open and close in reaction to pressure differentials thereacross. By maintaining a pressure of about 1.25 psi within transmission housing 18, valve 20 limits the amount of ambient air that is drawn into the transmission 10 as the air within the chamber 18 cools. Thus provided, the valve 20 limits the amount of moisture that is drawn into the chamber 18 during heating and cooling cycles. It would also be anticipated that slit 62 could be a single slit, as illustrated, or could comprise a series of parallel or perpendicular slits or a circular piercing arranged within vent 28 to open when a desired first and/or second pressure differential is met.

While the invention has been described in the specification and illustrated in the drawings with reference to a preferred embodiment, it will be understood by those skilled in the art that various changes may be made and equivalence may be substituted for elements thereof without departing from the scope of the invention as defined in the claims. In addition, many modifications may be made to adapt a particular situation or material to the teachings of the invention without departing from the essential scope, thereof. Therefore, it is intended that the invention not be limited to a particular embodiment illustrated by the drawings and described in the specification as the best mode presently contemplated for carrying out this invention, but that the invention will include any embodiments falling within the description of the appended claims.

What is claimed is:

1. A bi-directional vent valve comprising:
    a flexible member defined by an outer surface, an inner surface, said flexible member defining a sealable aperture between the outer surface to the inner surface configured to allow bi-directional flow directly through said flexible member, the sealable aperture being configured to seal between the outer surface and the inner surface when a differential pressure between the outer surface and the inner surface is less than a predetermined value, the flexible member being further configured to deform when the differential pressure exceeds predetermined value, thereby causing the sealable aperture to form an opening;
    an elongated body coupled to an outer surface of the flexible member; and
    a retaining ring coupled to the elongated body, the retaining ring configured to retain the flexible member within the elongated body.

2. The valve of claim 1, wherein the flexible member is curved.

3. The valve of claim 1, wherein the flexible member is formed in the shape of a dome.

4. The valve of claim 1, wherein the flexible member is constructed of fluorosilicon.

5. The valve of claim 1, wherein the flexible member is configured to open the sealable aperture when the pressure against the inner surface exceeds the pressure against the outer surface by a range of about 0.0 to 1.0 psid.

6. The valve of claim 1, wherein the flexible member is configured to open the sealable aperture when the pressure against the inner surface exceeds the pressure against the outer surface by about 0.25 psid.

7. The valve of claim 1, wherein the flexible member is configured to open the sealable aperture when the pressure against the outer surface exceeds the pressure against the inner surface by a range of about 0.0 to 3.0 psid.

8. The valve of claim 7, wherein the flexible member is configured to open the sealable aperture when the pressure against the inner surface exceeds the pressure against the outer surface by about 1.25 psid.

9. The valve of claim 1, further comprising a protective device coupled to the body.

10. The valve of claim 9, wherein the protective device defines a vent path between the protective device and the body.

11. The valve of claim 1, wherein the sealable aperture is a slit having a pair of adjacent mating surfaces.

12. An automotive component configured to vent a transmission comprising:
    an elongated body defined by a first end fluidly coupled to the transmission, a second end and a cavity extending from the first end to the second end;
    a flexible vent member coupled to said elongated body, wherein the flexible member is configured to seat between the first end and the second end, the flexible member being further configured to provide at least a portion of a bi-directional vent path between the first end and the second end in response to a predetermined pressure differential between the first end and the second end; and
    a retaining ring coupled to the elongated body, the retaining ring configured to retain the flexible member within the elongated body.

13. The component of claim 12, wherein the flexible member defines a slit having a pair of adjacent internal surfaces, the flexible member being configured to deform in response to the predetermined pressure differential, thereby causing the internal surfaces to separate and form said at least a portion of a vent path.

14. The component of claim 12, wherein the flexible member defines a curved surface.

15. A method of venting a chamber of an automotive component comprising:
    forming a slit within a flexible member, wherein the slit extends from an inner surface and an outer surface of the flexible member and provides bi-directional venting directly through the flexible member;
    coupling the flexible member to the automotive component, wherein the automotive component defines an aperture in fluid communication with the chamber, and the aperture defines at least a portion of a vent path for the chamber;
    providing a retaining ring and an elongated body; and
    coupling the flexible member to the elongated body with the retaining ring, the retaining ring configured to retain the flexible member within the elongated body.

16. The method of claim 15, wherein the elongated body includes a first end, a second end and an internal bore extending therebetween, and the internal bore defines at least a portion of the vent path for the chamber.

17. The method of claim 15, further comprising: forming the flexible member such that the outer surface is curved.

* * * * *

UNITED STATES PATENT AND TRADEMARK OFFICE
CERTIFICATE OF CORRECTION

PATENT NO. : 7,044,150 B2 Page 1 of 1
APPLICATION NO. : 10/608510
DATED : May 16, 2006
INVENTOR(S) : Gerard L. Seidl It is certified that error appears in the above-identified patent and that said Letters Patent is hereby corrected as shown below:

Col. 6, line 15, claim 12, "seat" should be --seal--

Signed and Sealed this

Twenty-ninth Day of August, 2006

JON W. DUDAS
*Director of the United States Patent and Trademark Office*